United States Patent
Koga et al.

(10) Patent No.: US 9,962,773 B2
(45) Date of Patent: May 8, 2018

(54) DRILL AND METHOD FOR MANUFACTURING CUT PRODUCT USING SAME

(71) Applicant: KYOCERA Corporation, Kyoto-shi, Kyoto (JP)

(72) Inventors: Kenichirou Koga, Dongguan (CN); Makoto Ide, Kagoshima (JP)

(73) Assignee: KYOCERA Corporation, Kyoto (JP)

( * ) Notice: Subject to any disclaimer, the term of this patent is extended or adjusted under 35 U.S.C. 154(b) by 148 days.

(21) Appl. No.: 14/787,092

(22) PCT Filed: Apr. 24, 2014

(86) PCT No.: PCT/JP2014/061610
§ 371 (c)(1),
(2) Date: Oct. 26, 2015

(87) PCT Pub. No.: WO2014/175396
PCT Pub. Date: Oct. 30, 2014

(65) Prior Publication Data
US 2016/0074944 A1    Mar. 17, 2016

(30) Foreign Application Priority Data

Apr. 26, 2013  (JP) ................................. 2013-093769
Aug. 29, 2013  (JP) ................................. 2013-177534
(Continued)

(51) Int. Cl.
*B23B 51/02*     (2006.01)

(52) U.S. Cl.
CPC ........ *B23B 51/02* (2013.01); *B23B 2251/046* (2013.01); *B23B 2251/085* (2013.01);
(Continued)

(58) Field of Classification Search
CPC .............. B23B 51/02; B23B 2251/046; B23B 2251/085; B23B 2251/14; B23B 2251/18; Y10T 408/9097
See application file for complete search history.

(56) References Cited

U.S. PATENT DOCUMENTS 4,878,788 A * 11/1989 Wakihira ................ B23B 51/02
                                                                  408/199
4,898,503 A *  2/1990 Barish ..................... B23B 51/02
                                                                  408/230
(Continued)

FOREIGN PATENT DOCUMENTS

DE         10337985 A1 *  3/2005 ............. B32B 51/02
DE    102004055198 A1 *  5/2006 ............. B32B 51/00
(Continued)

OTHER PUBLICATIONS

International Search Report (Form PCT/ISA/210) dated Jun. 24, 2014 and issued for International Patent Application No. PCT/JP2014/061610.
(Continued)

*Primary Examiner* — Eric A Gates
(74) *Attorney, Agent, or Firm* — Procopio Cory Hargreaves and Savitch LLP

(57) ABSTRACT

A drill according to an embodiment of the present invention has a pair of main cutting edges positioned at a front end of a drill body, a pair of first chisel edges each extending from the pair of main cutting edges toward a rotation axis, and a second chisel edge positioned between the pair of first chisel edges and intersecting with the rotation axis of the drill body. When viewing a locus of rotation of the pair of first chisel edges and a locus of rotation of the second chisel edge in a cross section taken so as to include the rotation axis, the respective locus of rotation of the pair of first chisel edges have a rectilinear shape, and respective imaginary straight
(Continued)

Figure 1:
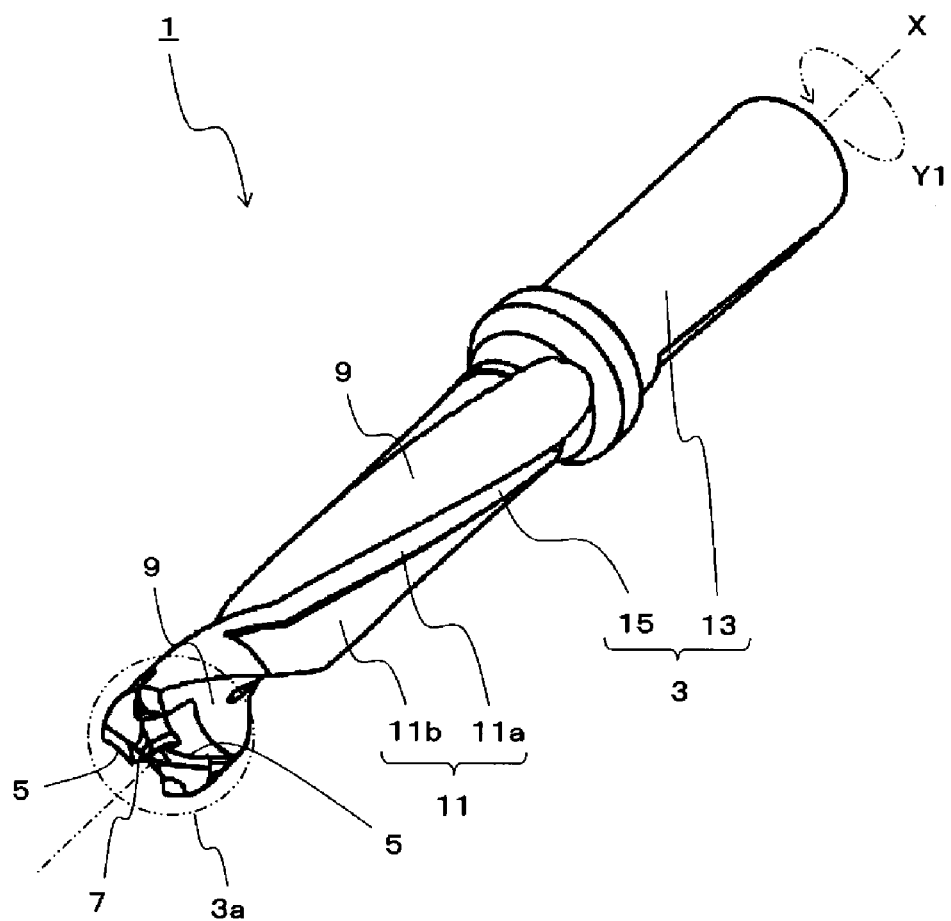

lines obtained by extending the locus of rotation of the pair of first chisel edges toward the rotation axis are positioned further to a rear end side of the drill body than the locus of rotation of the second chisel edge.

12 Claims, 21 Drawing Sheets

(30) Foreign Application Priority Data

Sep. 18, 2013 (JP) .................................. 2013-192860
Sep. 18, 2013 (JP) .................................. 2013-192861

(52) U.S. Cl.
CPC ....... *B23B 2251/14* (2013.01); *B23B 2251/18* (2013.01); *B23B 2251/408* (2013.01); *B23B 2251/50* (2013.01); *B23B 2251/70* (2013.01)

(56) References Cited

U.S. PATENT DOCUMENTS

| | | | | |
|---|---|---|---|---|
| 4,983,079 A * | 1/1991 | Imanaga | .................. | B23B 51/02 408/144 |
| 5,846,035 A * | 12/1998 | Karafillis | .................. | B23B 51/02 408/1 R |
| 7,101,125 B2 * | 9/2006 | Borschert | .................. | B23B 51/02 408/230 |
| 7,267,514 B2 * | 9/2007 | Wetzl | .................. | B23B 51/02 408/225 |
| 7,789,599 B2 * | 9/2010 | Takikawa | .................. | B23B 51/02 408/230 |
| 8,061,938 B2 * | 11/2011 | Sampath | .................. | B23B 51/02 408/230 |
| 8,257,000 B2 * | 9/2012 | Onose | .................. | B23B 51/02 408/230 |
| 8,342,781 B2 * | 1/2013 | Soittu | .................. | B23B 51/02 408/211 |
| 8,408,850 B2 * | 4/2013 | George | .................. | B23B 51/02 408/227 |
| 8,740,515 B2 * | 6/2014 | Thomas | .................. | B23B 51/02 408/144 |
| 8,858,134 B2 * | 10/2014 | Glimpel | .................. | B23B 51/02 408/230 |
| 8,944,729 B2 * | 2/2015 | Krenzer | .................. | B23B 51/02 408/230 |
| 9,004,825 B2 * | 4/2015 | Gruber | .................. | B23B 51/02 408/1 R |
| 9,545,676 B2 * | 1/2017 | Sun | .................. | B23B 51/02 |
| 2008/0019787 A1 * | 1/2008 | Sampath | .................. | B23B 51/02 408/230 |
| 2008/0152438 A1 * | 6/2008 | Volokh | .................. | B23B 51/02 407/54 |
| 2010/0135741 A1 * | 6/2010 | Probst | .................. | B23B 51/02 408/230 |
| 2011/0268518 A1 * | 11/2011 | Sampath | .................. | B23B 51/02 408/59 |
| 2011/0318128 A1 * | 12/2011 | Schwagerl | .................. | B23B 51/02 408/200 |
| 2012/0009034 A1 * | 1/2012 | Mack | .................. | B23B 51/02 408/226 |
| 2012/0093600 A1 * | 4/2012 | Sampath | .................. | B23B 51/02 408/225 |
| 2012/0201619 A1 * | 8/2012 | Olsson | .................. | B23B 51/02 408/230 |

FOREIGN PATENT DOCUMENTS

| | | | | | |
|---|---|---|---|---|---|
| DE | 102008029404 A1 | * | 12/2009 | ............. | B32B 51/02 |
| EP | 88037 A1 | * | 9/1983 | | |
| EP | 1925386 A1 | * | 5/2008 | ............. | B32B 51/02 |
| EP | 2441544 A1 | * | 4/2012 | | |
| GB | 2260283 A | * | 4/1993 | ............. | B32B 51/02 |
| GB | 2484597 A | | 4/2012 | | |
| JP | 2004-34202 A | | 2/2004 | | |
| JP | 2006281407 A | * | 10/2006 | | |
| JP | 2007050477 A | * | 3/2007 | | |
| WO | WO 2011135277 A1 | * | 11/2011 | ............. | B32B 51/02 |

OTHER PUBLICATIONS

Extended European Search Report dated Nov. 7, 2016 issued by the European Patent Office for counterpart European Patent Application No. 14787474.7.

* cited by examiner

DRILL AND METHOD FOR MANUFACTURING CUT PRODUCT USING SAME

TECHNICAL FIELD

The present invention relates to a drill used for cutting and a method for manufacturing a cut product.

BACKGROUND

A drill disclosed in Japanese Unexamined Patent Application Publication No. 2004-34202A (Patent Document 1) is known as a drill conventionally used for cutting a work material, such as a metal member and the like. In the drill disclosed in Patent Document 1, a part of a chisel edge smoothly connected to a main cutting edge is removed by x-type thinning so that the drill has a second cutting edge that functions as a thinning cutting edge. According to this, as the cutting speed of the main cutting edge is faster than that of the chisel edge including the thinning cutting edge, chips generated by the chisel edge are pulled by chips generated by the main cutting edge. As a result, cracks are generated in the chips generated by the chisel edge, and it is thus possible to fragment the chips into fine pieces.

In recent years, in such a case when a cutting tool is used for deep hole drilling in which the depth of the drilled hole is large with respect to the tool diameter, it is necessary to improve the durability of the cutting tool. Therefore, countermeasures, such as making the web thickness of the drill body thicker, have been considered. However, when the web thickness of the drill body is made thicker, the flute becomes shallower. As a result, the pulling force of the chips generated by the main cutting edge, which pulls the chips generated by the chisel edge including the thinning cutting edge, becomes smaller. Thus, the chips are less likely to be fragmented and tend to become long, and there is a risk that the chips may become clogged in the flute.

In light of the foregoing, an object of the present invention is to provide a drill that is capable of fragmenting chips in a favorable manner even when a web thickness of a drill body is made thicker.

SUMMARY OF THE INVENTION

A drill according to an embodiment of the present invention includes a rod-shaped drill body caused to rotate around a rotation axis,
a pair of main cutting edges positioned in a front end portion of the drill body,
a minor cutting edge that is positioned in the front end portion and connects the pair of main cutting edges, and a pair of flutes that are provided in an outer periphery of the drill body and extend in a spiral manner around the rotation axis from the pair of main cutting edges toward a rear end portion of the drill body. The minor cutting edge has a pair of first chisel edges each extending from the pair of main cutting edges toward the rotation axis, and a second chisel edge that is positioned between the pair of first chisel edges so as to intersect with the rotation axis and that is shorter than each of the pair of first chisel edges. When viewing a locus of rotation of the pair of first chisel edges and a locus of rotation of the second chisel edge in a cross section taken so as to include the rotation axis, the locus of rotation of the pair of first chisel edges has a rectilinear shape, and an imaginary straight line obtained by extending the locus of rotation of the first chisel edges toward the rotation axis is positioned further to a rear end side of the drill body than the locus of rotation of the second chisel edge.

BRIEF DESCRIPTION OF THE DRAWING(S)

Figure 2:
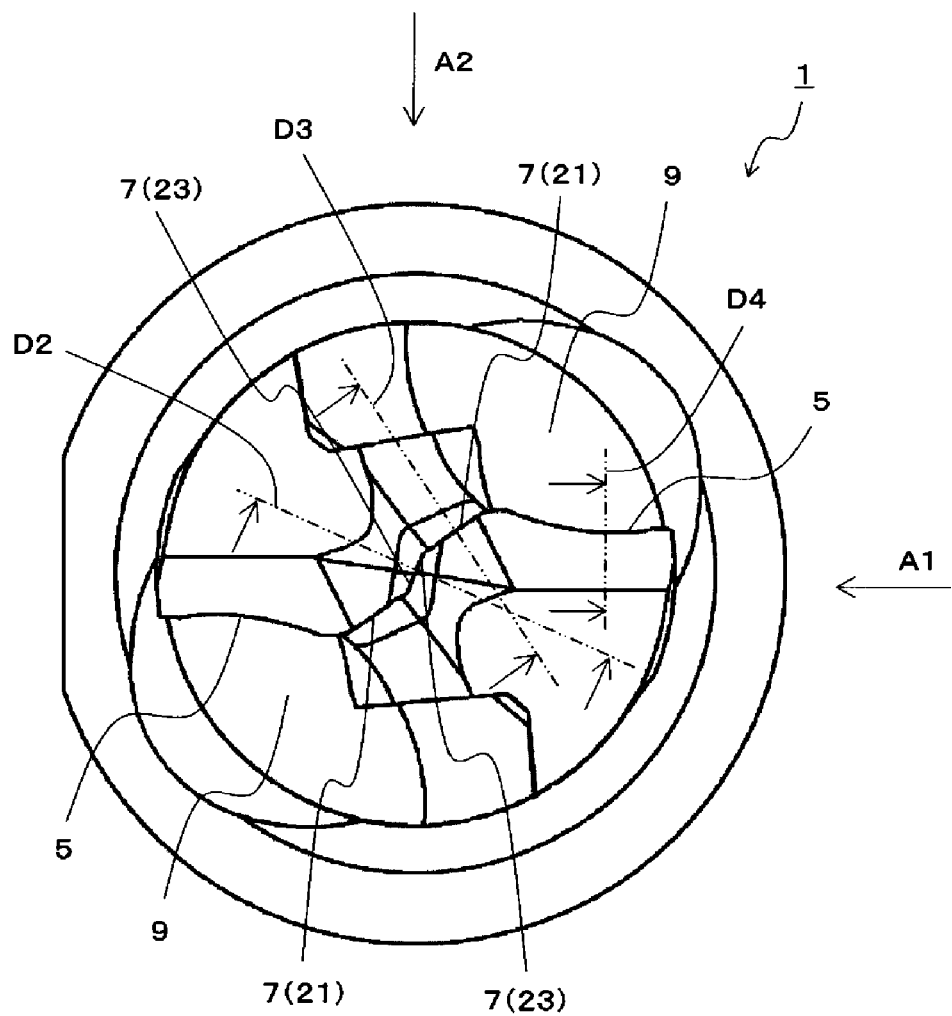
Figure 3:
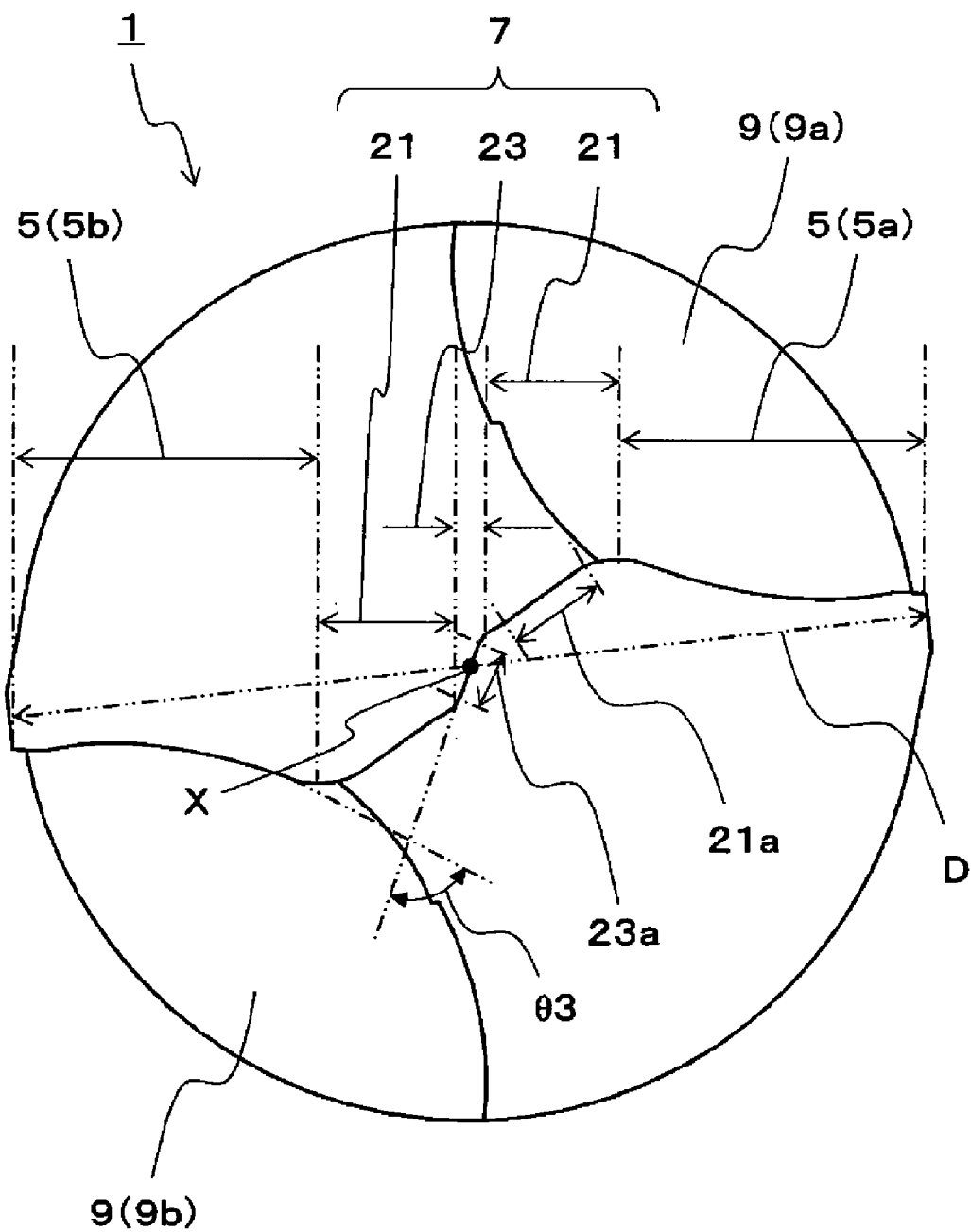
Figure 4:
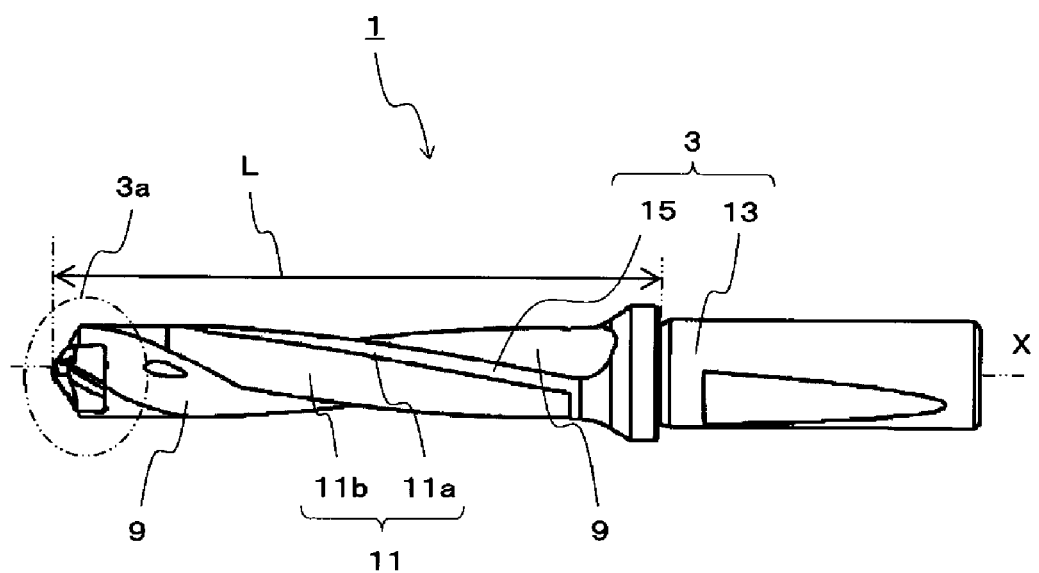
Figure 5:
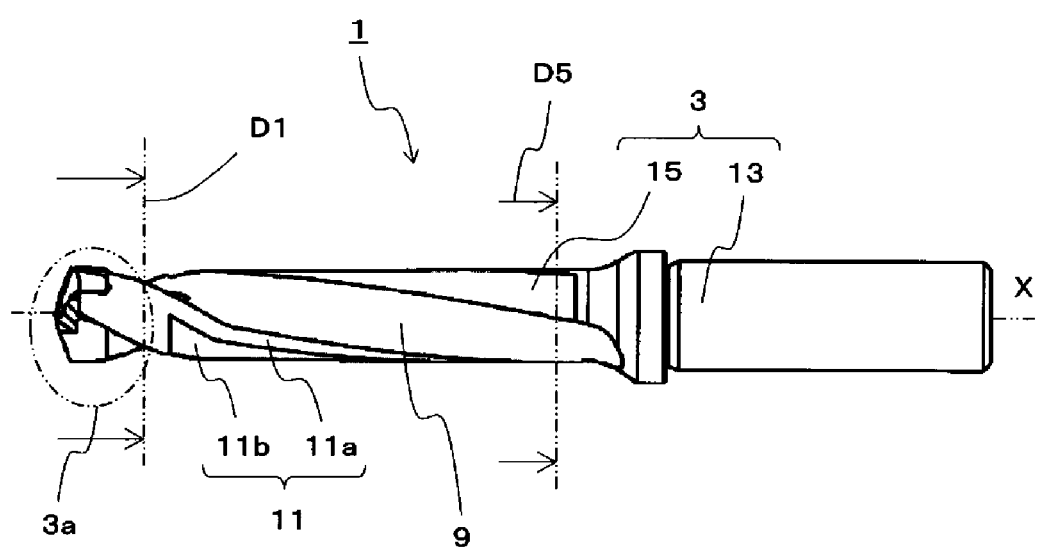
Figure 6:
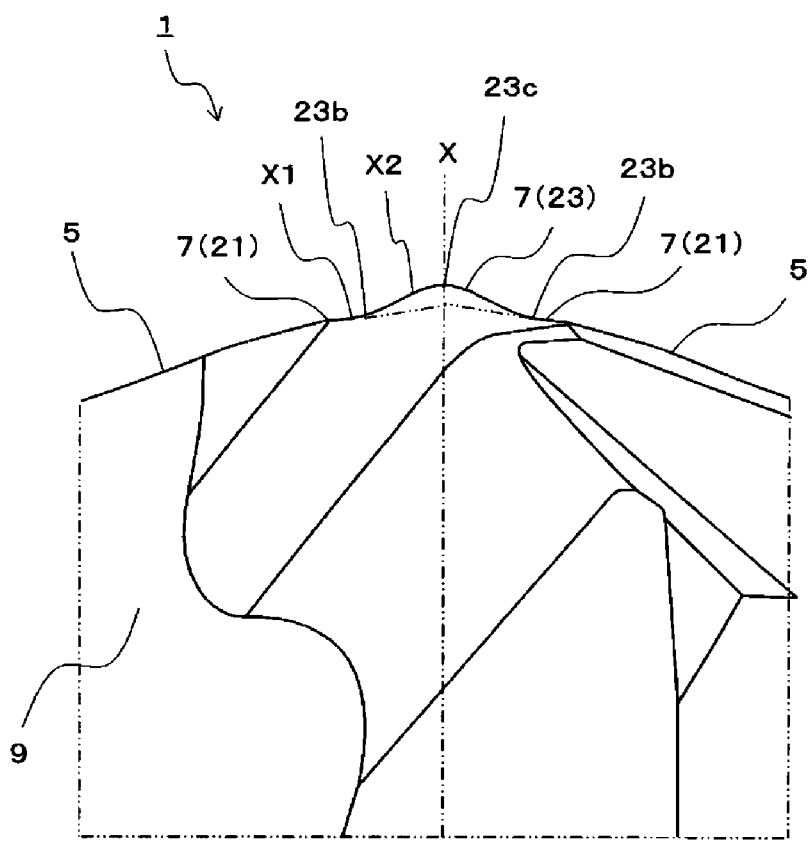
Figure 7:
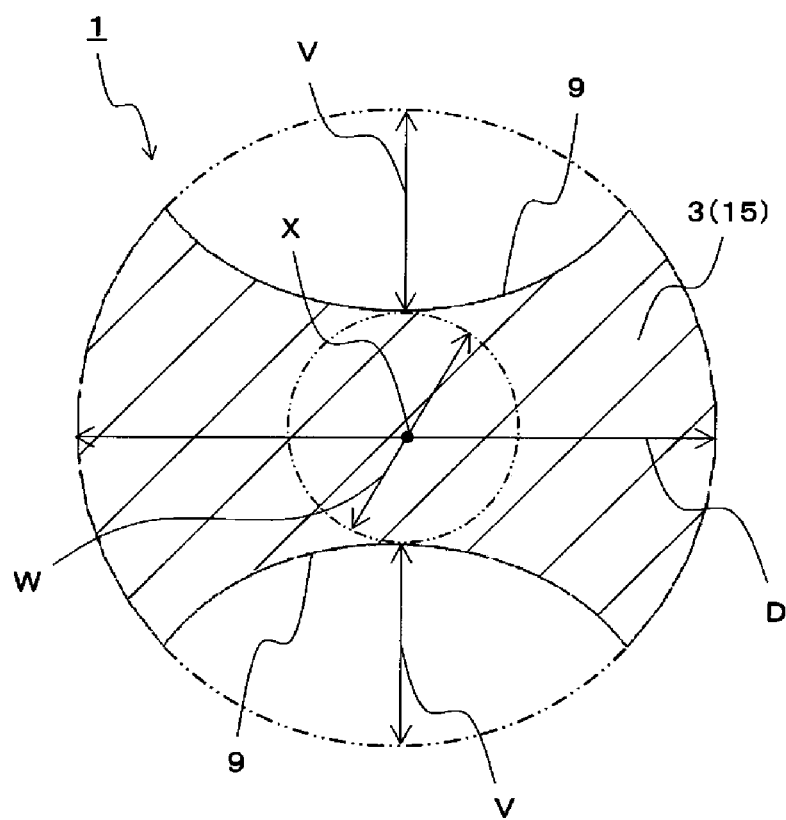
Figure 8:
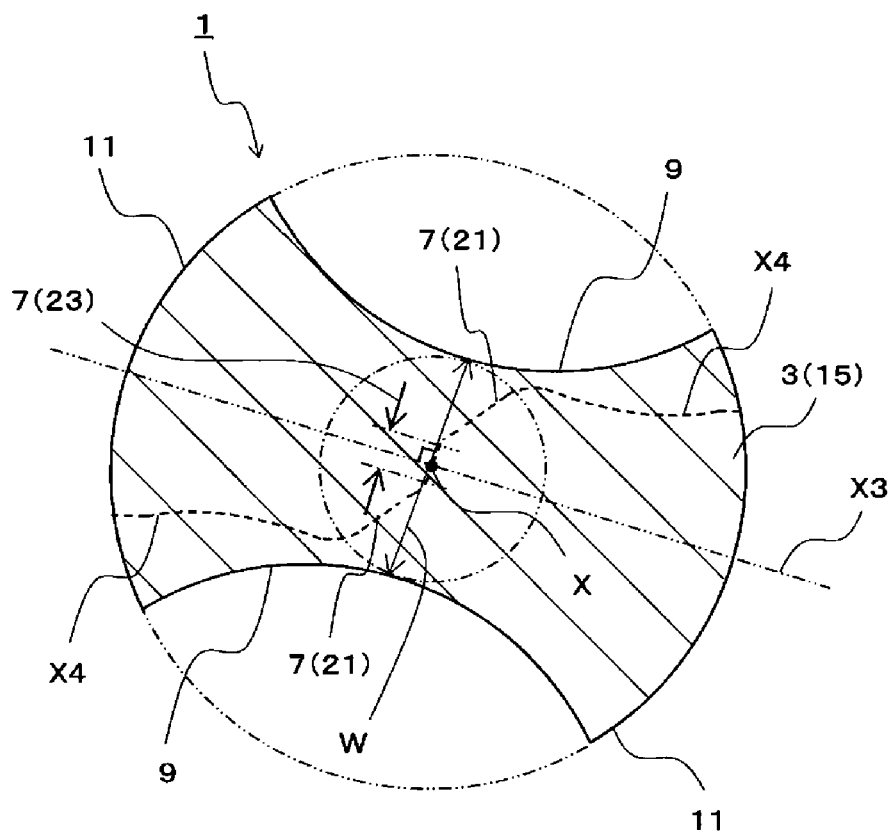
Figure 9:
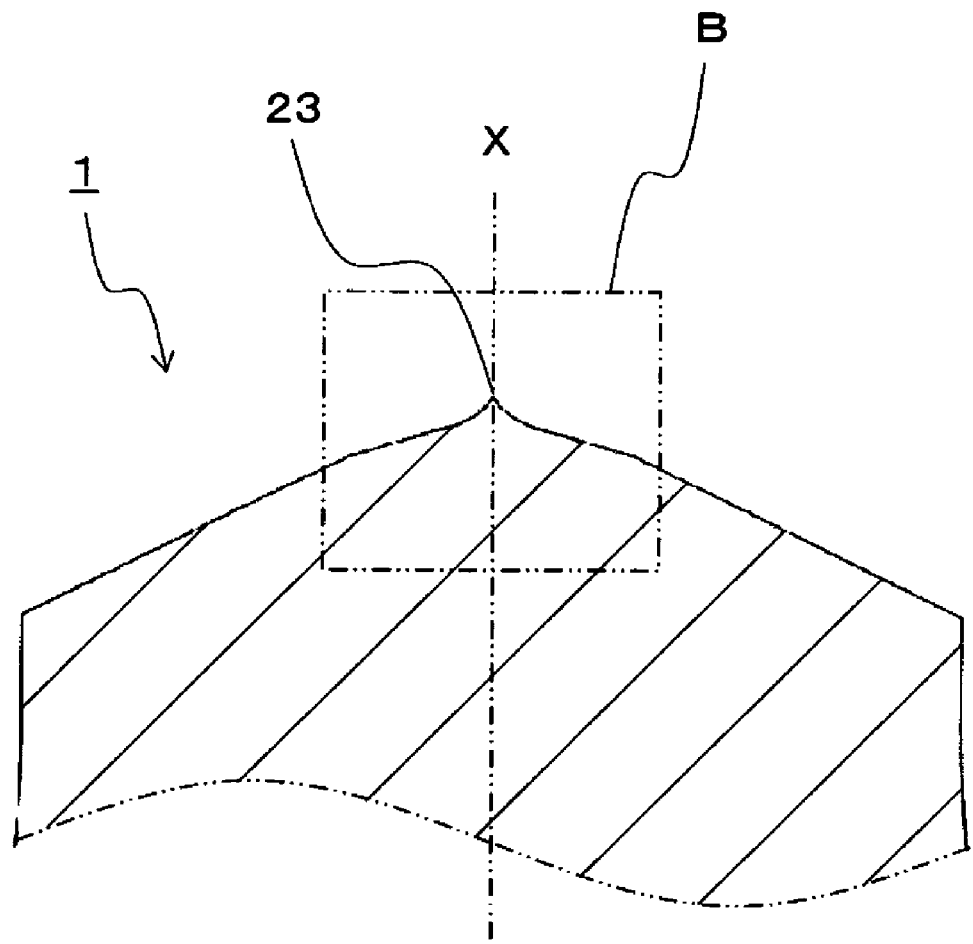
Figure 10:
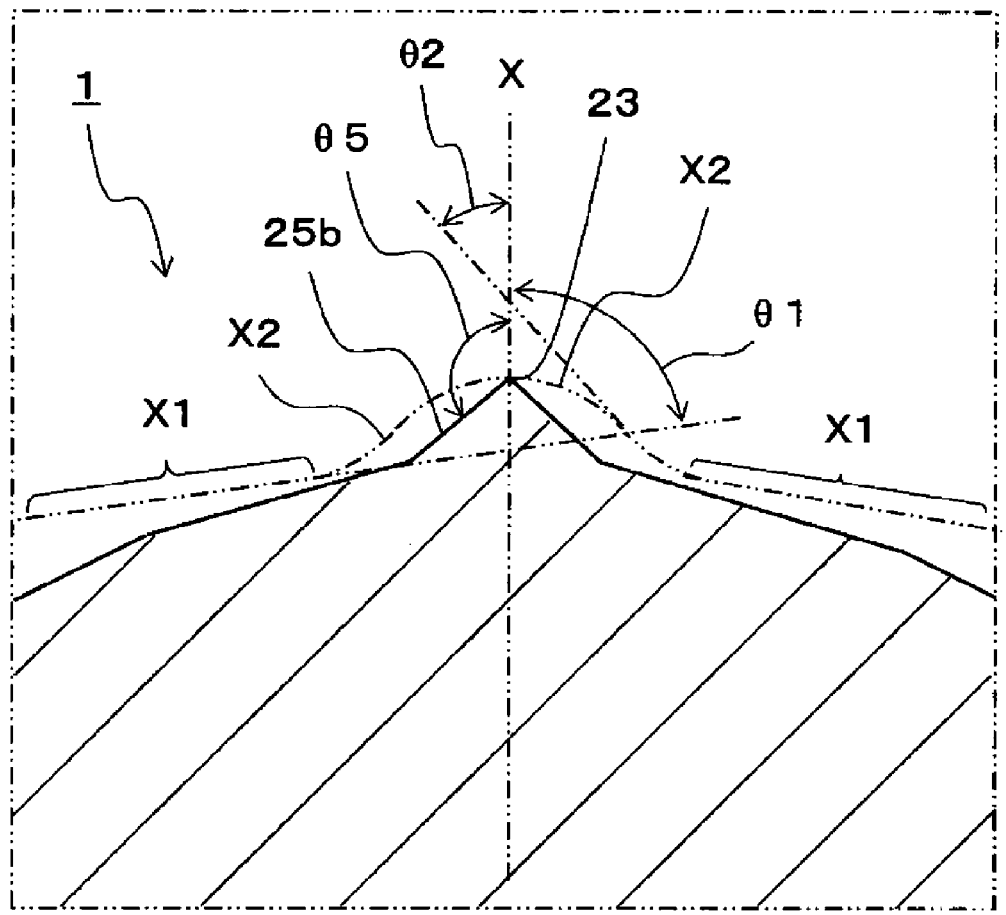
Figure 11:
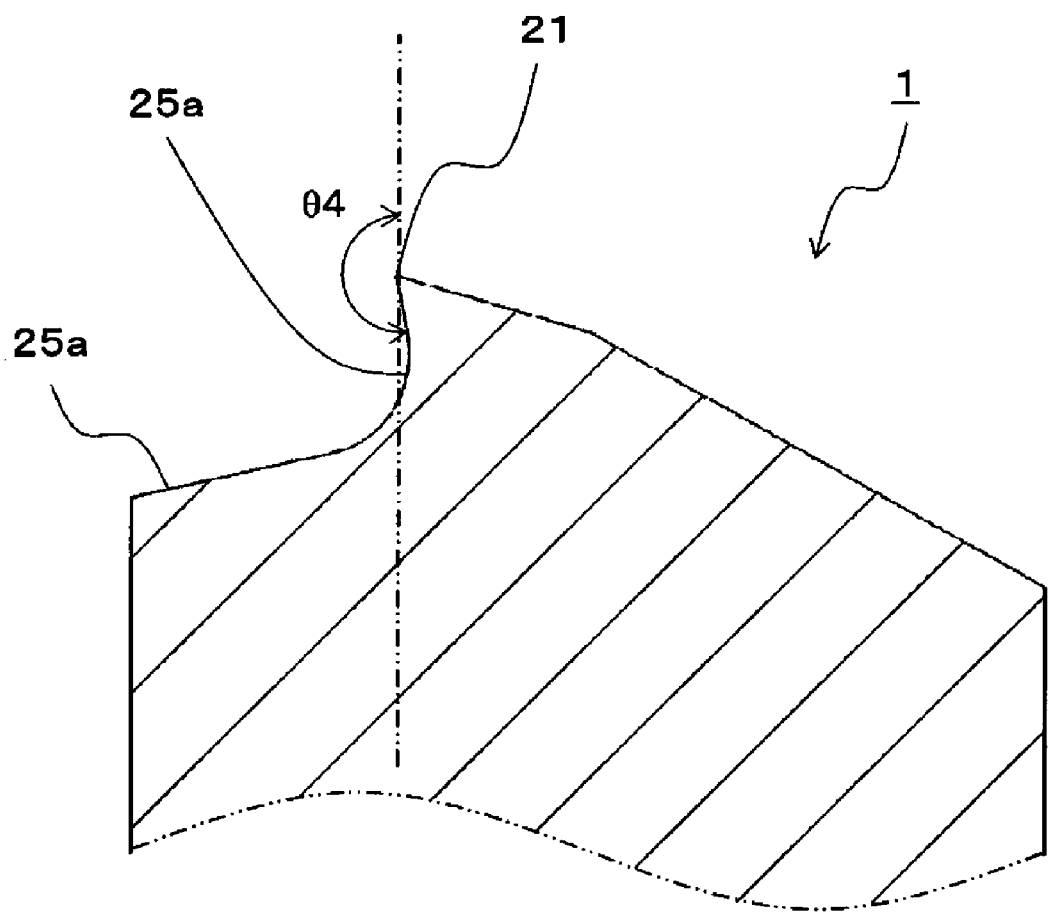
Figure 12:
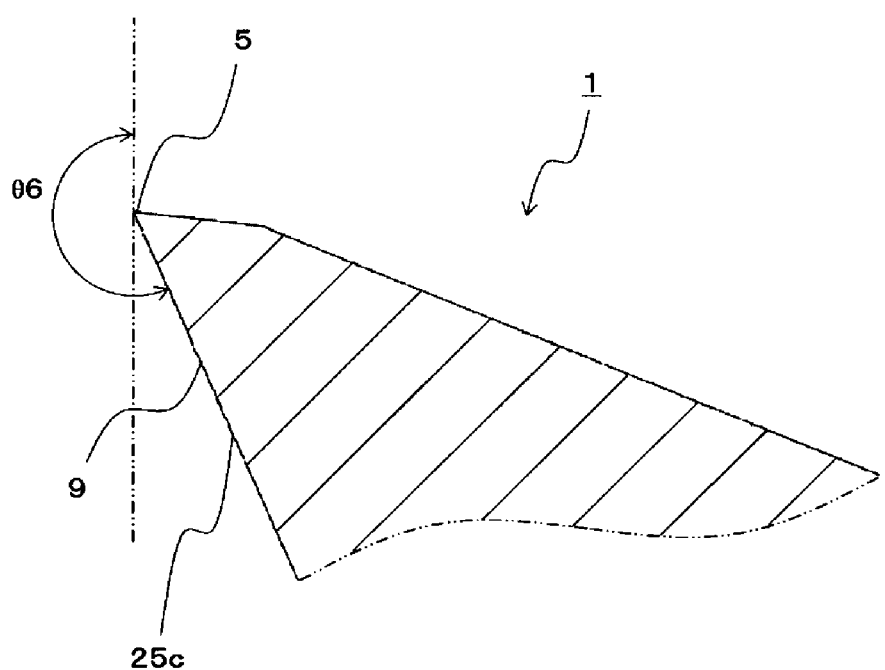
Figure 13:
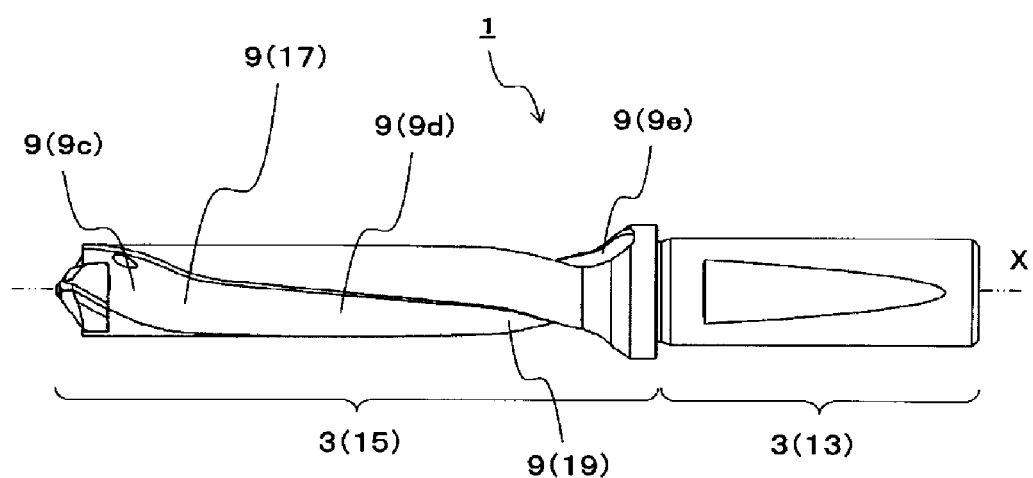
Figure 14:
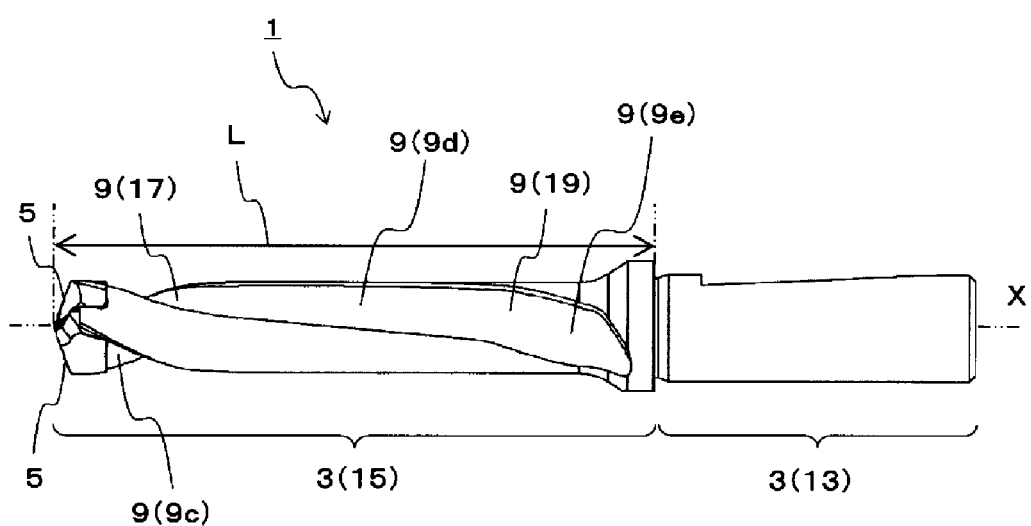
Figure 15:
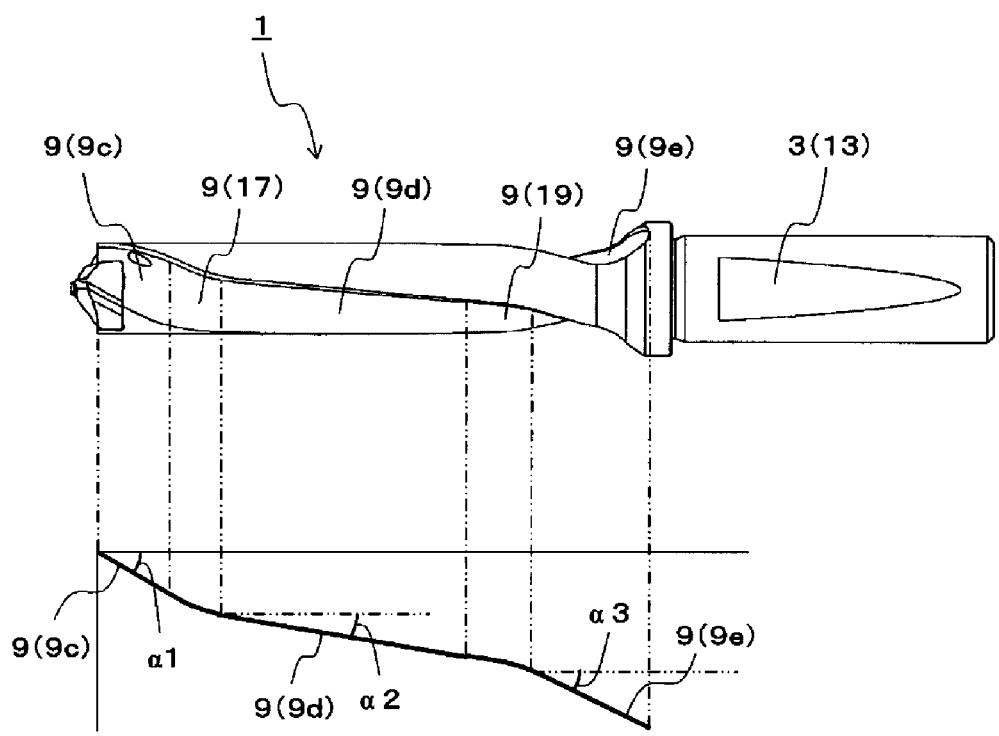
Figure 16:
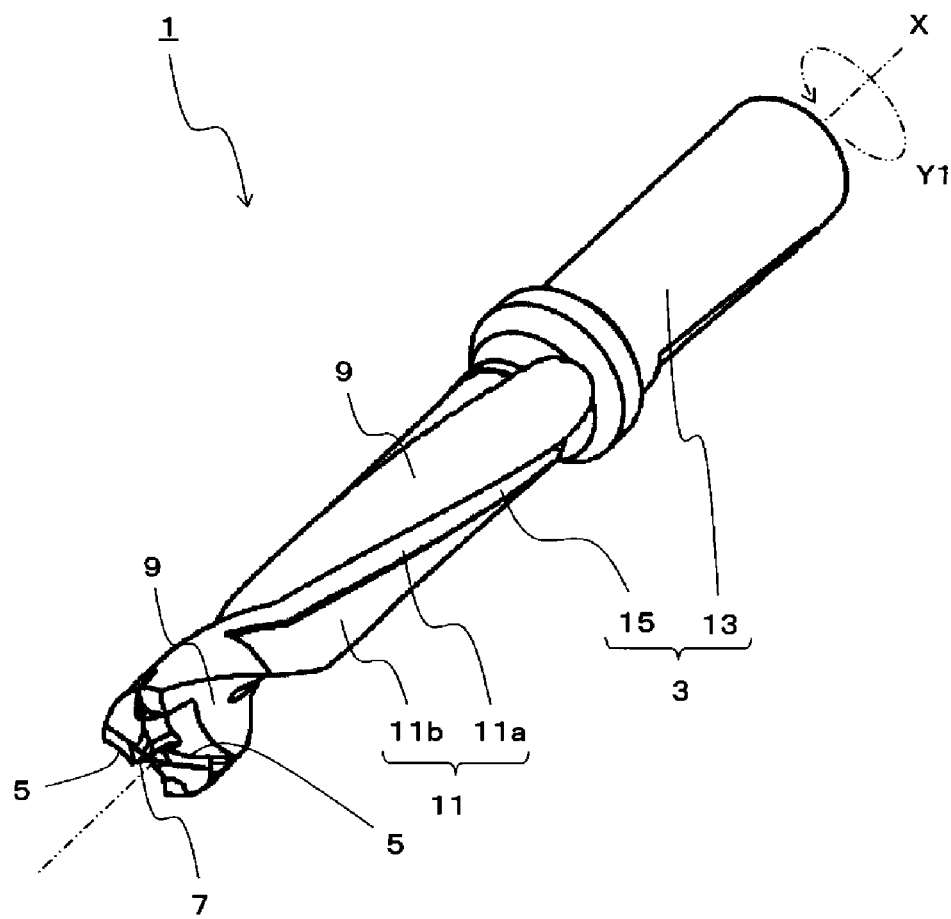
Figure 17:
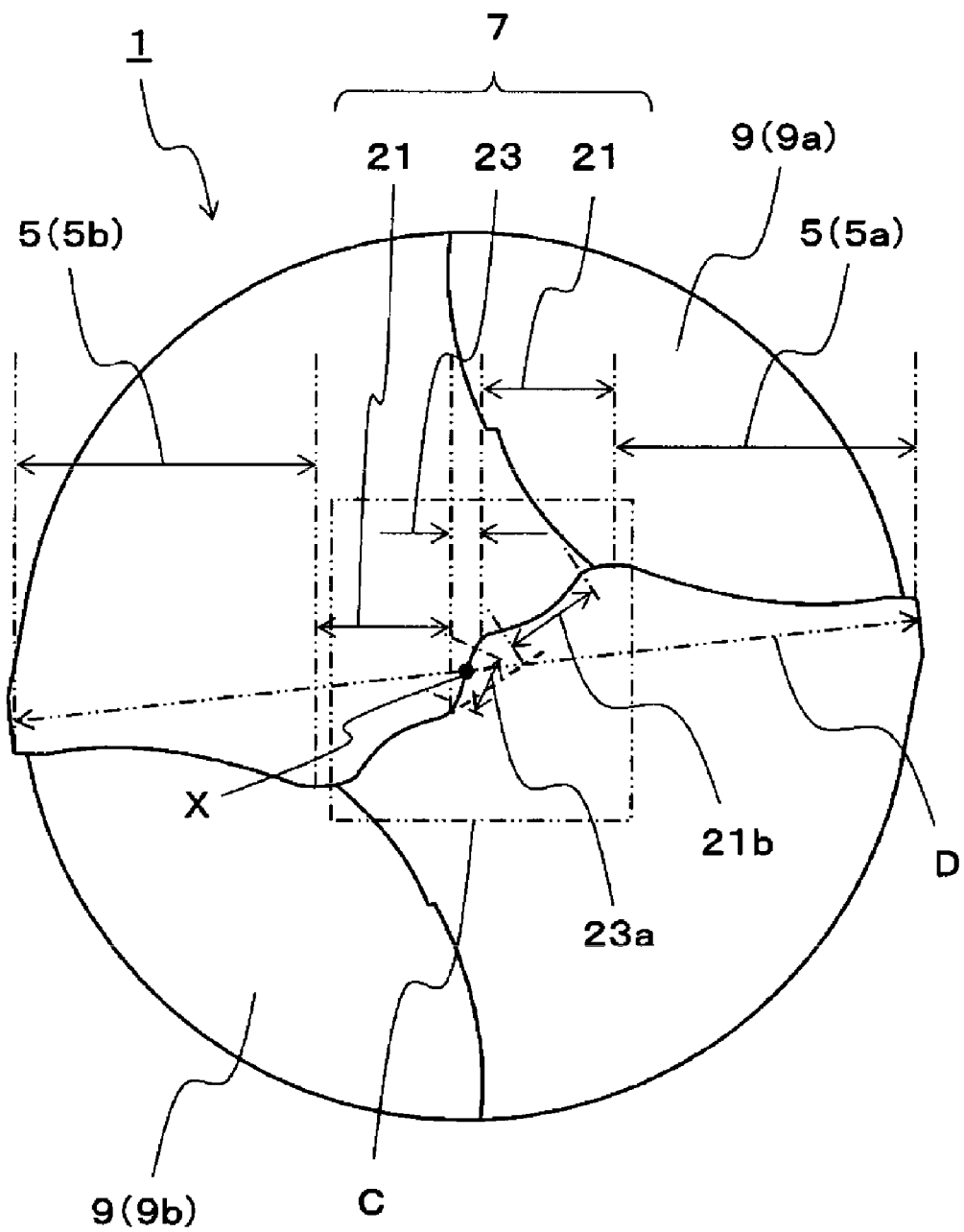
Figure 18:
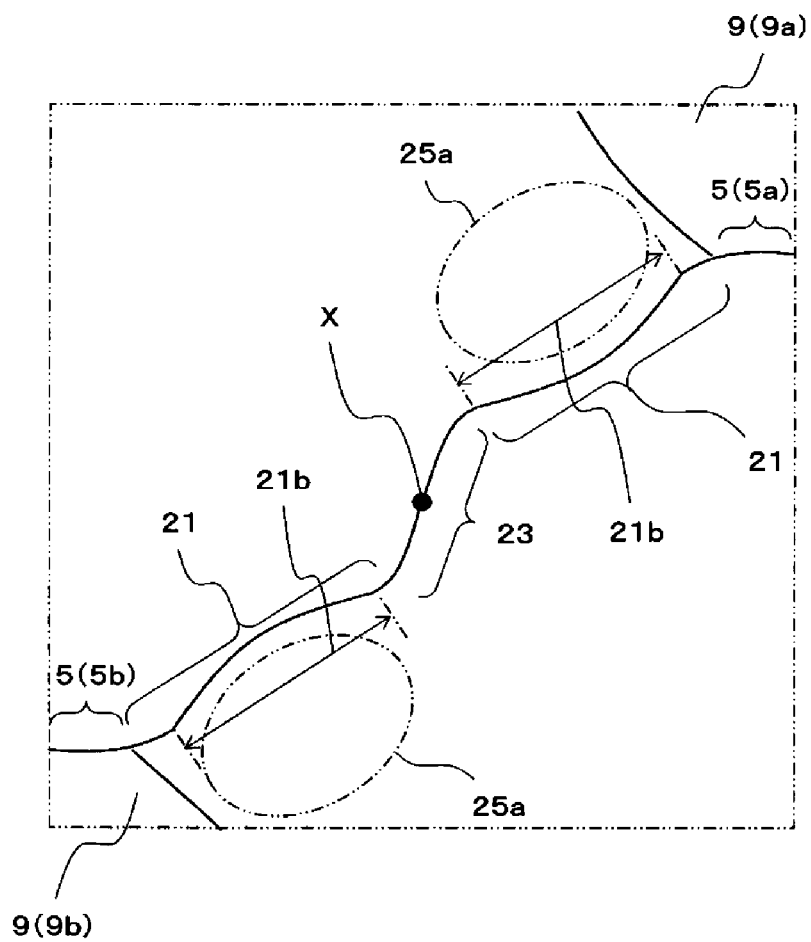
Figure 19:
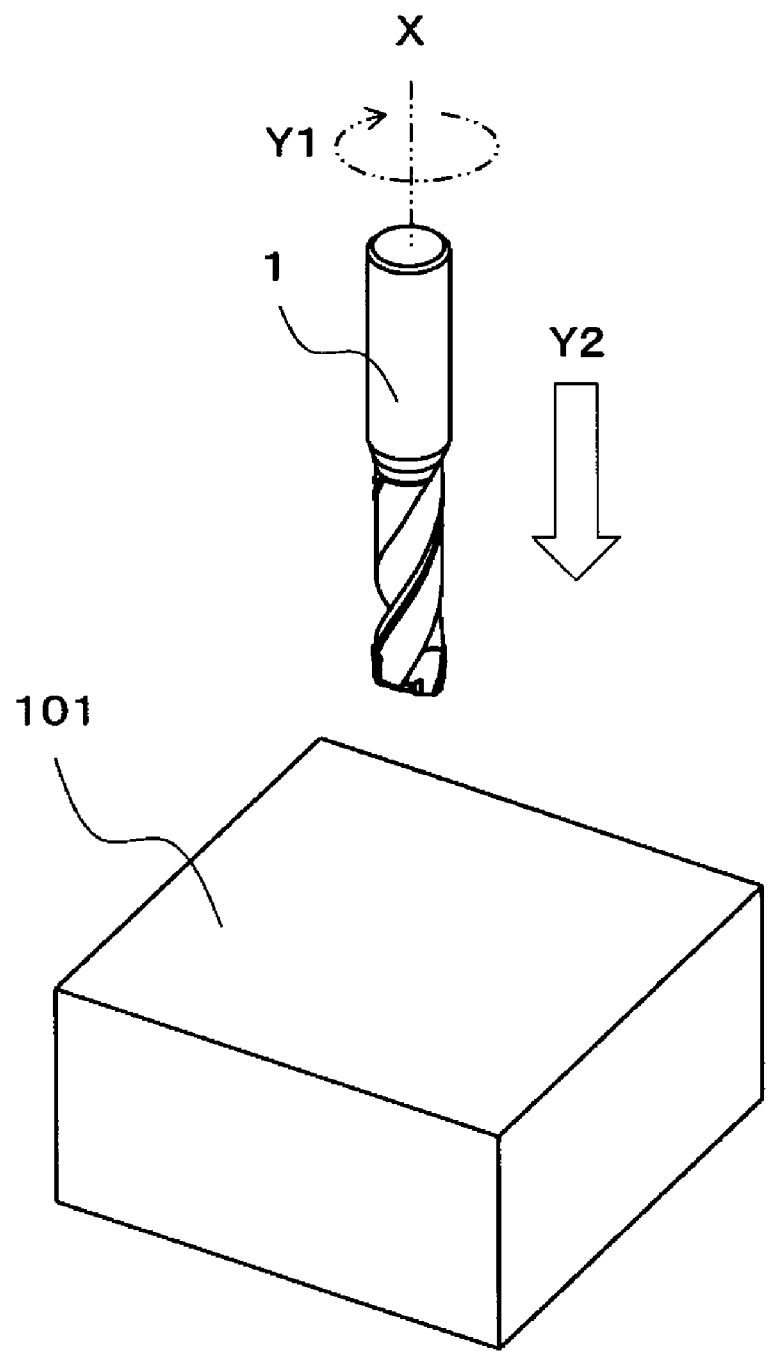
Figure 20:
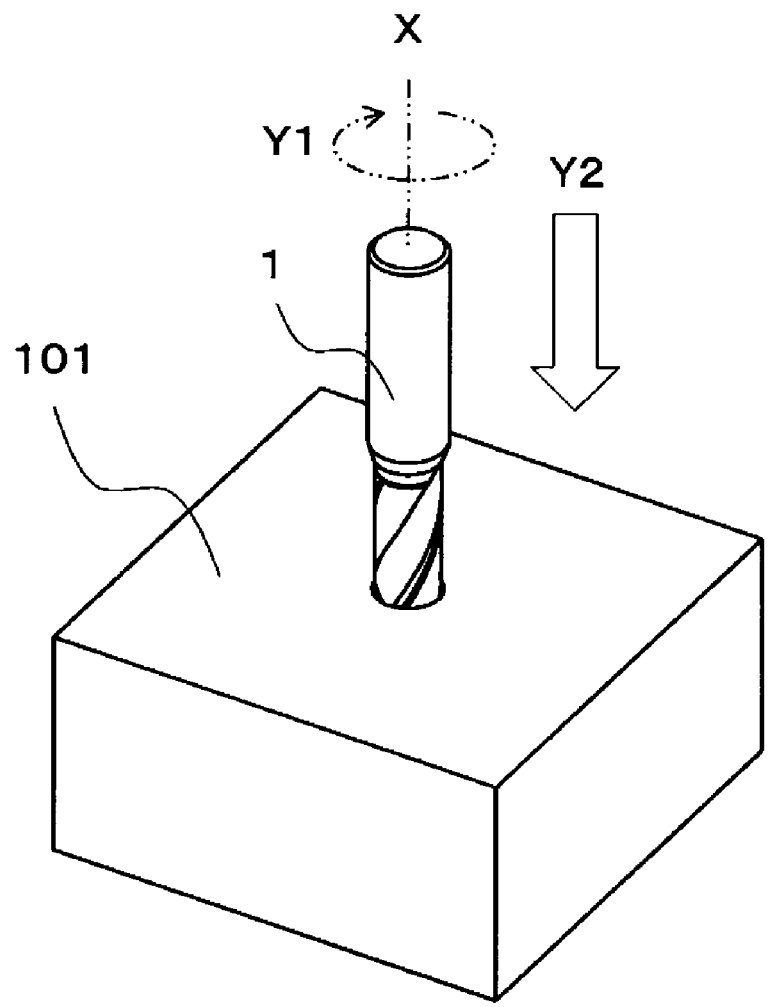
Figure 21:
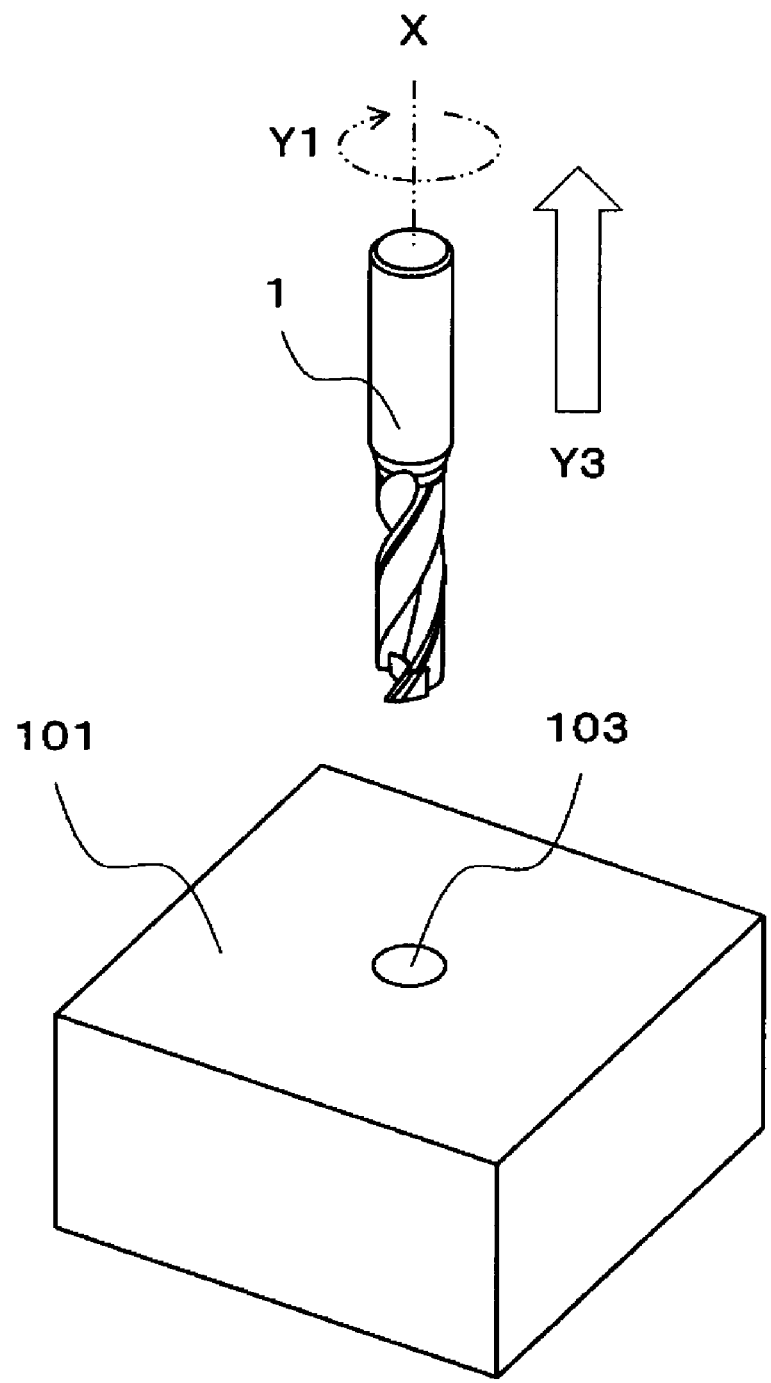

FIG. 1 is a perspective view illustrating a drill according to a first embodiment of the present invention.
FIG. 2 is a front view as viewed from a direction of a front end of the drill illustrated in FIG. 1.
FIG. 3 is a simplified schematic view of a configuration of the drill illustrated in FIG. 2.
FIG. 4 is a side view of the drill illustrated in FIG. 2, as viewed from a direction A1.
FIG. 5 is a side view of the drill illustrated in FIG. 2, as viewed from a direction A2.
FIG. 6 is a side view illustrating an enlarged front end section of the drill illustrated in FIG. 5.
FIG. 7 is a cross-sectional view of a cross section D1 of the drill illustrated in FIG. 5.
FIG. 8 is a cross-sectional view of a cross section D5 of the drill illustrated in FIG. 5.
FIG. 9 is a cross-sectional view of a cross section D2 of the drill illustrated in FIG. 2.
FIG. 10 is an enlarged cross-sectional view of a region B of the drill illustrated in FIG. 9.
FIG. 11 is a cross-sectional view of a cross section D3 of the drill illustrated in FIG. 2.
FIG. 12 is a cross-sectional view of a cross section D4 of the drill illustrated in FIG. 2.
FIG. 13 is a side view illustrating a modified example of the drill illustrated in FIG. 4.
FIG. 14 is a side view illustrating the drill illustrated in FIG. 13 from a different direction.
FIG. 15 is a schematic view illustrating a helix angle of the drill illustrated in FIG. 13.
FIG. 16 is a perspective view illustrating a drill according to a second embodiment of the present invention.
FIG. 17 is a front view as viewed from a direction of a front end of the drill illustrated in FIG. 16.
FIG. 18 is an enlarged view of a region C of the drill illustrated in FIG. 17.
FIG. 19 is a perspective view illustrating one step of a method for manufacturing a cut product according to an embodiment of the present invention.
FIG. 20 is a perspective view illustrating one step of the method for manufacturing a cut product according to the embodiment of the present invention.
FIG. 21 is a perspective view illustrating one step of the method for manufacturing a cut product according to the embodiment of the present invention.

BEST MODE FOR CARRYING OUT THE INVENTION

A drill according to each embodiment of the present invention will be described below with reference to the appended drawings. However, for convenience of explanation, each drawing referred to below only illustrates main constituent members of the respective embodiments, which are considered necessary for describing the present invention, in a simplified manner. Thus, the drill of the present invention may be provided with a chosen configuration that is not illustrated in each of the drawings referred to in this specification. Further, dimensions of the members indicated in each of the drawings do not accurately represent dimensions of the actual configuration, dimension ratios of respective members, etc.

[Drill]

First, a drill 1 according to a first embodiment of the present invention will be described in detail with reference to FIGS. 1 to 12.

The drill 1 according to the first embodiment is provided with a drill body 3, a pair of main cutting edges 5, a minor cutting edge 7, a pair of chip evacuation flutes 9 (hereinafter also simply referred to as flutes 9), and a pair of fluted land faces 11.

The drill body 3 has a rotation axis X and is configured so as to have a rod-shape extending along the rotation axis X. The drill body 3 of the present embodiment is provided with a gripped portion 13, which is called a shank and gripped by a rotating spindle of a machining tool, and with a cutting portion 15 that is called a body and positioned on a front end side of the gripped portion 13. The gripped portion 13 is a part designed in accordance with a shape of the rotation axis X of the machining tool. The cutting portion 15 is a part that comes into contact with a work material and plays a main role in cutting the work material. Note that an arrow Y1 in FIG. 1 indicates a rotational direction of the drill body 3.

The pair of main cutting edges 5 are formed in a front end portion 3a of the drill body 3, namely, in a front end section of the cutting portion 15. Further, the minor cutting edge 7 is also formed in the front end portion 3a of the drill body 3. The minor cutting edge 7 is positioned in the front end portion 3a of the drill body 3 so as to connect the pair of main cutting edges 5. The cutting of the work material is performed by the pair of main cutting edges 5 and the minor cutting edge 7.

The pair of main cutting edges 5 according to the present embodiment are configured so as to be formed in a concavely curved-shape in a front end view. As a result, as it becomes easier to cause chips generated by the pair of main cutting edges 5 to be curled, it becomes easier to evacuate the chips using the pair of flutes 9. Further, in order to improve cutting performance, the pair of main cutting edges 5 are provided so that the locus of rotation of the pair of main cutting edges 5 are each inclined with respect to the rotation axis X when the locus of rotation of the pair of main cutting edges 5 are viewed on a cross section including the rotation axis X.

The pair of main cutting edges 5 are positioned separately from each other on either side of the minor cutting edge 7. The main cutting edges 5 have 180 degree rotational symmetry with respect to a central axis of the drill body 3 in the front end view. The pair of main cutting edges 5 have the rotational symmetry in this manner, thereby inhibiting wobble from occurring between the pair of main cutting edges 5 when the pair of main cutting edges 5 bite into the work material. Therefore, stable deep hole drilling can be carried out. Note that, in this specification, the front end view means viewing the drill 1 from a side of the front end portion 3a of the drill body 3.

The pair of flutes 9 are provided on an outer periphery of the cutting portion 15 in the drill body 3. Ends of the pair of flutes 9 on the front end side are each connected to the pair of main cutting edges 5. The pair of flutes 9 extend around the rotation axis X in a spiral manner from the pair of the main cutting edges 5 toward a rear end of the drill body 3. At this time, the pair of flutes 9 are formed only in the cutting portion 15 and are not formed in the gripped portion 13, so that the drill body 3 is gripped by the machining tool in a stable manner.

The main purpose of the pair of flutes 9 is to evacuate the chips generated by the pair of main cutting edges 5 and the minor cutting edge 7. At the time of cutting, the chips generated by one main cutting edge 5a of the pair of main cutting edges 5 are evacuated to the rear end side of the drill body 3 through a flute 9a of the pair of flutes 9, the flute 9a being connected to the main cutting edge 5a. Further, the chips generated by the other main cutting edge 5b of the pair of main cutting edges 5 are evacuated to the rear end side of the drill body 3 through a flute 9b of the pair of flutes 9, the flute 9b being connected to the main cutting edge 5b.

Helix angles of the pair of flutes 9 of the present embodiment are designed so that the helix angle of the one flute 9a becomes the same as the helix angle of the other flute 9b. Further, although the helix angles of the pair of flutes 9 of the present embodiment are each designed so as to be constant from the front end to the rear end, the present invention is not necessarily limited to this type of configuration. For example, the pair of flutes 9 may be configured to have a plurality of helix angles as illustrated in FIGS. 13 to 15.

The pair of flutes 9 in a modified example illustrated in FIGS. 13 to 15 are each provided with a first region 9c, a second region 9d, and a third region 9e. The first region 9c is positioned closest to the front end side of the drill body 3 in the flute 9 and connected to the main cutting edge 5. The second region 9d is positioned further to the rear side of the drill body 3 than the first region 9c. The third region 9e is positioned further to the rear side of the drill body 3 and is positioned closest to the rear side of the drill body 3 in the entire flute 9. The ninth region 9c has a helix angle $\alpha 1$, the second region 9d has a helix angle $\alpha 2$, and the third region 9e has a helix angle $\alpha 3$.

The respective helix angles of the pair of flutes 9 in the present modified example are not constant from the front end to the rear end. Specifically, as illustrated in FIG. 15, the helix angle $\alpha 2$ in the second region 9d is smaller than the helix angle $\alpha 1$ in the first region 9c. Further, the helix angle $\alpha 3$ in the third region 9e is larger than the helix angle $\alpha 2$ in the second region 9d.

In the flute 9 in the present modified example, the first region 9c having the relatively large helix angle is positioned on the front end side of the cutting portion 15 so as to be connected to the main cutting edge 5. Thus, the chips cut by the main cutting edge 5 do not remain in the vicinity of the main cutting edge 5 and are promptly discharged to the rear end side of the cutting portion 15. Further, the flute 9 in the present modified example is provided with the second region 9d that is positioned further to the rear end side of the cutting portion 15 than the first region 9c. This configuration allows the chips, which are promptly discharged from the first region 9c, to be discharged further to the rear end side of the cutting portion 15. Further, as the second region 9d has the relatively small helix angle $\alpha 2$, the rigidity of the drill body 3 can be improved compared with a case in which the helix angle $\alpha 2$ and the helix angle $\alpha 1$ have the same value.

At this time, as the chips discharged from the second region 9d are distant from the first region 9c, the flow of the chips is likely to stagnate. However, the flute 9 is provided with the third region 9e that is positioned further to the rear end side of the cutting portion 15 than the second region 9d and that has a relatively large helix angle. This configuration allows the chips, which are discharged from the second region 9d to the third region 9e, to be promptly evacuated to the outside in the third region 9e having the relatively large helix angle.

The helix angle $\alpha 1$ can be set to from 15 to 45 degrees, for example. The helix angle $\alpha 2$ can be set to from 3 to 20 degrees, for example. The helix angle $\alpha 3$ can be set to from 15 to 30 degrees, for example.

In the drill 1 of the present modified example, the helix angle α1 of the first region 9c is set so as to be larger than the helix angle α3 of the third region 9e. The first region 9c in the flute 9 is connected to the main cutting edge 5, and the helix angle of the first region 9c is the largest. As a result, a large pushing force is applied to the chips at a stage when the chips are generated by the main cutting edge 5, and allows chip-evacuation performance to be further improved.

The pair of flutes 9 in the present modified example are further provided with a first connection region 17 and a second connection region 19 in addition to the first region 9c, the second region 9d, and the third region 9e. The first connection region 17 is positioned between the first region 9c and the second region 9d. Specifically, the second region 9d is connected to the first region 9c via the first connection region 17. The helix angle in the first connection region 17 changes smoothly from the front end side of the cutting portion 15 toward the rear end side of the cutting portion 15. Thus, the second region 9d is smoothly connected to the first region 9c via the first connection region 17.

The second connection region 19 is positioned between the second region 9d and the third region 9e. Specifically, the third region 9e is connected to the second region 9d via the second connection region 19. The helix angle in the second connection region 19 changes smoothly from the helix angle α2 to the helix angle α3 from the front end side of the cutting portion 15 toward the rear end side of the cutting portion 15. Thus, the third region 9e is smoothly connected to the second region 9d via the second connection region 19.

As the first region 9c and the second region 9d have different helix angles from each other, the flow direction of the chips changes in a section between the regions. Thus, in the section between the first region 9c and the second region 9d, the flow of the chips is likely to stagnate, and then the chips are likely to become clogged. However, having the first connection region 17 prevents the chips from becoming clogged in the section between the first region 9c and the second region 9d, which connects the regions smoothly.

Similarly, as the second region 9d and the third region 9e have different helix angles from each other, the flow direction of the chips changes in a section between the regions. However, having the second connection region 19, in the section between the second region 9d and the third region 9e, which connects the regions smoothly, reduces the risk of the chips becoming clogged.

In the drill 1 of the present modified example, a length of the second region 9d in the direction parallel to the rotation axis X is longer than each of lengths of the first region 9c and the third region 9e in the direction parallel to the rotation axis X. At the time of cutting, a load caused by the cutting is applied to the drill 1, and the cutting portion 15 bends in some cases. In those cases, a central section of the cutting portion 15 is more likely to bend significantly compared with a front end section and a rear end section of the cutting portion 15. However, as securing the length of the second region 9d in the direction parallel to the rotation axis X to be relatively longer than the lengths of the first region 9c and the third region 9e, the second region 9d having the relatively small helix angle and high rigidity, allows the cutting portion 15 to have good durability with respect to bending.

In the drill 1 of the present modified example, the length of the first region 9c in the direction parallel to the rotation axis X is set to be approximately from 10 to 20% of a length of the entire flute 9 in the direction parallel to the rotation axis X. The length of the second region 9d in the direction parallel to the rotation axis X is set to be approximately from 30 to 40% of the length of the entire flute 9 in the direction parallel to the rotation axis X. The length of the third region 9e in the direction parallel to the rotation axis X is set to be approximately from 15 to 25% of the length of the entire flute 9 in the direction parallel to the rotation axis X.

Note that as the flute 9 according to the present modified example has the first connection region 17 and the second connection region 19, the total of the above-described lengths of the first region 9c, the second region 9d, and the third region 9e does not become 100% with respect to the length of the entire flute 9 in the direction parallel to the rotation axis X.

Further, when the above-described length of the second region 9d having the relatively small helix angle is longer than the above-described lengths of the first region 9c and the third region 9e, each of which having the relatively large helix angle, this configuration allows the length of the entire flute 9 to be shortened without excessively impeding the flow of the chips.

The cutting portion 15 according to the present embodiment is shaped by removing sections corresponding to the pair of flutes 9, etc. from a column extending along the rotation axis X. A section of the cutting portion 15, from which the pair of flutes 9 are removed, namely, a section positioned between the pair of flutes 9 forms fluted land faces 11. The fluted land face 11 according to the present embodiment has a margin 11a that is adjacent to the flute 9 on a rear side of a rotational direction of the rotation axis X and a body clearance 11b that is adjacent to the margin 11a on the rear side of the rotational direction of the rotation axis X.

On a cross-section that includes the rotation axis X and is perpendicular to the rotation axis X, the margin 11a has an arc-shape positioned on the same circle. A diameter of the circle corresponds to an outer diameter of the cutting portion 15. The body clearance 11b is a surface formed so as to avoid friction between the outer periphery of the drill body 3 and a working surface while carrying out the cutting. Therefore, a distance of the body clearance 11b from the rotation axis X is designed to be shorter than that of the margin 11a so as to cause a gap to be created between the body clearance 11b and the working surface.

A depth V of the pair of flutes 9 can be set to be approximately from 10 to 40% of the outer diameter of the cutting portion 15. Here, as illustrated in FIG. 7, the depth V of the flute 9 refers to a value obtained by subtracting a distance from a bottom of the flute 9 to the rotation axis X, on the cross section perpendicular to the rotation axis X, from a radius of the drill body 3. Thus, a diameter W of a web thickness, which is represented by a diameter of an inscribed circle on the cross section perpendicular to the rotation axis X in the cutting portion 15, is set to be approximately from 30 to 80% of the outer diameter of the cutting portion 15. Specifically, when the outer diameter of the cutting portion 15 is 20 mm, for example, the depth V of the flute 9 can be set to be approximately from 2 to 8 mm.

Note that the helix angle in the present embodiment refers to an angle formed between a leading edge (a leading edge of land) that is an intersection line formed by the flute 9 and the margin 11a, and an imaginary straight line that passes through a point on the leading edge and is parallel to the rotation axis X.

In the drill 1 of the present embodiment, the outer diameter of the cutting portion 15 may be set to be from 6 to 42.5 mm, for example. Further, in the drill 1 of the present embodiment, when a length of an axis line (a length of the cutting portion 15) is defined as L and a diameter (the outer diameter of the cutting portion 15) is defined as D, it is sufficient to set a relationship of L=3D~12D.

A material of the drill body 3 may be a hard metal alloy containing WC (tungsten carbide) and Co (cobalt), where Co (cobalt) is a binder, an alloy generated by adding additives such as TiC (titanium carbide) or TaC (tantalum carbide) to the above-described hard metal alloy, a metal such as stainless and titanium, or the like.

The cutting portion 15 according to the present embodiment has a configuration in which a part on the front end side, which includes the pair of main cutting edges 5, the minor cutting edge 7, a part of the pair of flutes 9, and a part of the pair of fluted land faces 11, can be attached to and removed from a part on the rear side.

The minor cutting edge 7 according to the present embodiment is positioned in the front end section of the cutting portion 15 so as to connect the pair of main cutting edges 5. The minor cutting edge 7 has a pair of first chisel edges 21 and a second chisel edge 23. The pair of first chisel edges 21 each extend from the pair of main cutting edges 5 so as to become closer to the rotation axis X. Thus, the pair of first chisel edges 21 each extend from the pair of main cutting edges 5 toward the rotation axis X. The second chisel edge 23 connects the pair of first chisel edges 21. Of the entire chisel edge formed by the pair of first chisel edges 21 and the second chisel edge 23, the pair of first chisel edges 21 function as a thinning edge.

Specifically, as illustrated in FIG. 2, when the drill body 3 is viewed from the front end, the second chisel edge 23 is positioned in a central section including the rotation axis X. Further, the pair of first chisel edges 21 are each positioned between both ends of the second chisel edge 23 and the pair of main cutting edges 5. In the front end view, the second chisel edge 23 and the pair of first chisel edges 21 have 180 degree rotational symmetry with respect to the rotation axis X of the drill body 3, similarly to the pair of main cutting edges 5. The second chisel edge 23 and the pair of first chisel edges 21 play a role in cutting the work material along with the pair of main cutting edges 5.

As the cutting speed is slow in a central section around which the drill 1 rotates, a larger cutting resistance is applied to the minor cutting edge 7 than to the pair of main cutting edges 5. Thus, for the purpose of securing the strength of the cutting edges, when cut along an imaginary plane including the rotation axis X, it is necessary to have a large inclination angle of a locus of rotation of the minor cutting edge 7 with respect to the rotation axis X.

At this time, because the first chisel edge 21 is formed by removing a part of the chisel edge by thinning, for example, an intersection angle between a cutting face and a flank of the pair of first chisel edges 21 becomes smaller than an intersection angle between a cutting face and a flank of the second chisel edge 23. Thus, when the second chisel edge 23 and the first chisel edges 21 are compared, the first chisel edges 21 tend to have lower durability.

In the drill 1 of the present embodiment, when a locus of rotation X1 of the pair of first chisel edges 21 and a locus of rotation X2 of the second chisel edge 23 are viewed on the cross section including the rotation axis X, the locus of rotation X1 of each of the first chisel edges 21 has a rectilinear shape. As a result, the strength of the first chisel edges 21 is enhanced, and thus, the minor cutting edge 7 can have good durability.

Further, each of imaginary straight lines obtained by extending each of the locus of rotations of the first chisel edges 21 toward the rotation axis X is positioned closer to the rear end side of the drill body 3 than the locus of rotation of the second chisel edge 23. This configuration suppresses the wobble generated when the pair of main cutting edges 5 and the minor cutting edge 7 bite into the work material, while suppressing a deterioration in the durability of the first chisel edges 21. As a result, it becomes possible to cut the work material in a favorable manner while enhancing the durability of the minor cutting edge 7.

Further, in the above-described cross sectional view, an inclination angle $\theta 2$ with respect to the rotation axis X, of a locus of a section, on the locus of rotation X2 of the second chisel edge 23, which comes close to the locus of rotation X1, is smaller than an inclination angle $\theta 1$ with respect to the rotation axis X, of the locus of rotation X1 of the pair of first chisel edges 21. This configuration allows the second chisel edge 23 to bite into the work material in a favorable manner.

In the front end view, the pair of first chisel edges 21 according to the present embodiment has not only a curved section, but also a linear section 21a, as illustrated in FIG. 3. The linear section 21a is smoothly connected to the adjacent second chisel edge 23 and main cutting edge 5 via the curved section.

In recent years, in such a case when a cutting tool is used for deep hole drilling in which a depth of a drill hole is large with respect to the tool diameter, it is necessary to improve the durability of the cutting tool. Thus, as a countermeasure, it has been considered to make a web thickness of a drill body thicker, for example. In the present embodiment, a drill with a thick web thickness refers to a drill having a web thickness diameter that is from 0.3D to 0.5D with respect to the diameter D of the cutting portion 15, for example.

When the web thickness of the drill body 3 is made thicker, because the flutes 9 become shallower, the pair of main cutting edges 5 become shorter, and at the same time, the lengths of the pair of first chisel edges 21 and the second chisel edge 23 become longer. Thus, the pulling force applied to the chips generated by the second chisel edge 23 and the pair of first chisel edges 21 by the chips generated by the pair of main cutting edges 5 becomes weaker. As a result, as the chips are less likely to be fragmented and become longer, there is a risk that the chips may become clogged in the flutes 9.

However, because each of the imaginary straight lines obtained by extending each of the locus of rotations X1 of the first chisel edges 21 toward the rotation axis X is positioned closer to the rear end side of the drill body 3 than the locus of rotation X2 of the second chisel edge 23, the second chisel edge 23 ends up protruding toward the side away from the rear end of the second chisel edge 23 beyond extended lines of the locus of rotation X1 of the first chisel edges 21. As a result of causing the second chisel edge 23 to protrude toward the side away from the rear end by creating an angle difference between point angles of the first chisel edges 21 and the second chisel edge 23 in this manner, the second chisel edge 23 and the first chisel edges 21 do not come into contact with the work material continuously, but in a phased manner.

Thus, as a strain becomes large at a boundary between the chips generated by the second chisel edge 23 and the chips generated by the first chisel edges 21, cracks are more likely to be generated in the chips generated by the second chisel edge 23. As a result, even when the web thickness of the drill body 3 is made thicker, it is possible to fragment the chips in a favorable manner.

Further, in the front end view, when the first chisel edges 21 have the linear section 21a, the length of the pair of first chisel edges 21 can each be shortened. Thus, even when the flutes 9 become shallower, the pair of main cutting edges 5 become shorter, and the length of the pair of first chisel edges 21 become longer, this configuration allows deterioration in the strength of the first chisel edges 21 to be minimized. As a result, even when the web thickness of the drill body 3 is made thicker, it is possible to cut the work material in an even more favorable manner while improving the durability of the minor cutting edge 7.

Further, in the front end view, the second chisel edge 23 according to the present embodiment has a linear section 23a. The second chisel edge 23 is positioned so as to include the rotation axis X when the drill body 3 is viewed from the front end and is formed at a position closer to the rotation axis X than the pair of first chisel edges 21 and the pair of main cutting edges 5. Thus, although the pair of first chisel edges 21 and the pair of main cutting edges 5 perform the cutting in such a way as to cut the work material, the second chisel edge 23 more easily performs the cutting in such a way as to crush the work material, as the cutting speed is relatively slow.

As the second chisel edge 23 performs the cutting in such a way as to crush the work material in the above-described manner, a force is applied from the work material to the second chisel edge 23 in a direction along the rotation axis X. In order to enhance durability with respect to such a force, in the present embodiment, the second chisel edge 23 has the linear section 23a as viewed from the front end. Having this type of the linear section 23a enables the length of the second chisel edge 23 to be shortened, and thus, the minor cutting edge 7 can have good durability.

Further, in the front end view, imaginary straight lines extended from both ends of the linear section 23a of the second chisel edge 23 each intersect with the imaginary straight lines extended from the linear section 21a of the pair of first chisel edges 21. When the web thickness of the cutting portion 15 is made thicker, because the flutes 9 become shallower, the pair of main cutting edges 5 become shorter, and at the same time, the lengths of the second chisel edge 23 and the first chisel edges 21 become longer. Thus, the pulling force applied to the chips generated by the second chisel edge 23 and the first chisel edges 21 by the chips generated by the main cutting edges 5 becomes weaker. Thus, there is a possibility that the chips are less likely to be fragmented and become excessively long.

However, in the front end view, the second chisel edge 23 and the first chisel edges 21 each have the linear sections 23a and 21a, and the imaginary straight lines extended along those sections intersect with each other. Therefore, the strain becomes large at the boundary between the chips generated by the second chisel edge 23 and the chips generated by the first chisel edges 21, and thus, cracks are more likely to be generated in the chips generated by the second chisel edge 23. As a result, even when the web thickness of the cutting portion 15 is made thicker, this configuration is capable of fragmenting the chips in a favorable manner.

In a side view, on the second chisel edge 23, both end sections 23b that are connected to the pair of first chisel edges 21 are positioned further to the rear end side of the drill body 3 than a central section 23c that intersects with the rotation axis X. As a result of the central section 23c of the second chisel edge 23 protruding toward the side away from the rear end, the section that intersects with the rotation axis X in the second chisel edge 23 protrudes toward the side away from the rear end. This configuration can suppress the wobble, generated when the pair of main cutting edges 5 and the minor cutting edge 7 bite into the work material.

Specifically, as illustrated in FIG. 6, the second chisel edge 23 has the central section 23c that is shaped as a convexly curved surface in a side view from a direction perpendicular to the section of the second chisel edge 23 intersecting with the rotation axis X. A central section of the convexly curved surface corresponds to the central section 23c of the second chisel edge 23, and the central section of the convexly curved surface is configured so as to protrude toward the side away from the rear end.

When the second chisel edge 23 is formed in a pointed shape toward the side away from the rear end, this pointed shape can suppress the wobble, generated when the minor cutting edge 7 bites into the work material. However, the durability of the second chisel edge 23 deteriorates.

In the drill 1 of the present embodiment, in a side view from a direction along the linear section of the second chisel edge 23, the cutting face and the flank of the second chisel edge 23 intersect with each other at an acute angle. This configuration can suppress the wobble, generated when the minor cutting edge 7 bites into the work material. In addition, in a side view from a direction perpendicular to the linear section 23a of the second chisel edge 23 and the rotation axis X, as the second chisel edge 23 does not have an acutely angled shape, but is shaped as the convexly curved surface, the second chisel edge 23 can enjoy good durability while suppressing the above-described wobble at the same time.

As already described above, the pair of main cutting edges 5 according to the present embodiment are configured so as to be formed in the concavely curved shape in the front end view. In this way, when the pair of main cutting edges 5 have the concavely curved section, an angle θ3, at which a tangent of an end of the concavely curved section on the side connected to the first chisel edge 21 and the imaginary straight line along the linear section 23a in the second chisel edge 23 intersect with each other, is preferably a right angle or an acute angle.

By this, a large strain tends to be generated in a section between the chips generated by the second chisel edge 23 and the chips generated by the main cutting edges 5. The strain more easily causes cracks in the chips generated by the second chisel edge 23. The cracks can fragment the chips in a favorable manner.

At this time, the tangent of the end of a part of the concavely curved section in the pair of main cutting edges 5 connected to the first chisel edge 21, and the imaginary straight line along the linear section 21a in the first chisel edge 21 preferably intersect with each other at an obtuse angle, and the imaginary straight line along the linear section 21a in the first chisel edge 21 and the imaginary straight line along the linear section 23a of the second chisel edge 23 preferably intersect with each other at an obtuse angle.

Of the second chisel edge 23, the pair of first chisel edges 21, and the pair of main cutting edges 5, when adjacent cutting edge regions intersect with each other at a right angle or an acute angle, a strain generated in the chips becomes excessively large, and the chips generated in the respective cutting edge regions may become fragmented. In this case, the cracks occurring in the chips generated by the second chisel edge 23 do not spread to the chips generated by the pair of main cutting edges 5. This results in becoming difficult to fragment the chips generated by the pair of main cutting edges 5 in a favorable manner.

However, the above-described configuration of the second chisel edge 23, the pair of first chisel edges 21, and the pair of main cutting edges 5 make it easier to cause the cracks to occur in the chips generated by the second chisel edge 23, and at the same time, to cause the cracks that have occurred in the chips generated by the second chisel edge 23 to spread to the chips generated by the pair of main cutting edges 5 in a favorable manner.

In the drill 1 of the present embodiment, an inclination angle θ4 of a cutting face 25a of the first chisel edge 21 is larger than an inclination angle θ5 of a cutting face 25b of the second chisel edge 23 with respect to an imaginary straight line parallel to the rotation axis X, and an inclination angle θ6 of a cutting face 25c of the pair of main cutting edges 5 is larger than the inclination angle θ4 of the cutting face 25a of the first chisel edge 21 with respect to the imaginary straight line parallel to the rotation axis X. In this way, of the cutting edge regions of the second chisel edge 23, the first chisel edge 21, and the main cutting edges 5, the cutting edge regions have larger face angles as they are positioned further to the outer periphery side of the drill body 3. As a result, it is possible to cause the cutting speed to become faster as the cutting edge regions are positioned further to the outer peripheral side of the drill body 3.

By this, the chips generated by the second chisel edge 23 are more easily pulled by the chips generated by the first chisel edges 21, and further, the chips generated by the first chisel edges 21 are more easily pulled by the chips generated by the main cutting edge 5. As a result, the cracks occur even more easily in the chips generated by the second chisel edge 23 and the first chisel edges 21, thereby enabling the chips to be fragmented into finer pieces.

In order to cause the inclination angles of the cutting faces 25b and 25c of the first chisel edge 21 and the main cutting edge 5 to be larger, a part of the cutting face 25b of the first chisel edge 21 is preferably positioned further to the rear side than the first chisel edge 21 in the rotational direction Y1, and at the same time, a part of the cutting face 25c of the main cutting edge 5 is preferably positioned further to the rear side in the rotational direction Y1 than the main cutting edge 5.

Further, the pair of flutes 9 in the drill 1 of the present embodiment have substantially constant flute width and depth in their main sections, except for sections which are positioned in rear ends of the flutes 9, where the flute depth becomes suddenly shallow, namely, sections in which the flutes are closed off.

When the width and depth of the flutes 9 are substantially constant in this manner, as illustrated in FIG. 8, an imaginary straight line X3 connecting central sections of the pair of fluted land faces 11 is preferably perpendicular to the second chisel edge 23. In other words, when the drill 1 of the present embodiment is viewed as a perspective from the front end, the imaginary straight line X3 connecting the respective central sections of the pair of fluted land faces 11, which are positioned between the above-described rear ends in the pair of flutes 9, is preferably perpendicular to the linear section 23a in the second chisel edge 23.

Note that FIG. 8 illustrates a cross section that is perpendicular to the rotation axis X and that includes the rear ends in the main sections of the pair of flutes 9 in which the flute width and depth are substantially constant. Further, in FIG. 8, the main cutting edges 5 and the minor cutting edge 7 are projected and illustrated as imaginary lines X4. Further, in the present specification, "being perpendicular" does not mean being strictly right-angled, but means being right-angled with a tolerance of approximately from −5 to 5 degrees.

Further, as described above, the rear ends of the pair of flutes 9 according to the present embodiment refers to the rear ends of the main sections in which the flute width and depth are substantially constant. Therefore, the rear ends do not refer to the rear ends of the entire flutes 9, namely, the above-described rear ends in which the flute depth becomes suddenly shallow.

When the cutting is performed using the drill 1, a load is likely to be applied in the direction perpendicular to the linear section 23a in the second chisel edge 23. Particularly, as the rear end section of the cutting portion 15, which is separated from the second chisel edge 23, is largely affected by the above-described load, a so-called chatter vibration occurs originating from the above-described rear ends of the pair of flutes 9.

In general, the rigidity of the drill 1 on the cross section in the direction perpendicular to the rotation axis X becomes largest with respect to the direction connecting the respective central sections of the pair of fluted land faces 11. The imaginary straight line X3 connecting the respective central sections of the pair of the fluted land faces 11 is perpendicular to the second chisel edge 23 in the section largely affected by the above-described load, namely, at the above-described rear ends of the pair of flutes 9. This configuration is capable of improving durability against the above-described load and to suppress the chatter vibration.

In the drill 1 of the present embodiment, the minor cutting edge 7 is formed by the above-described second chisel edge 23 and the pair of first chisel edges 21, and the diameter W of the web thickness of the cutting portion 15 at the above-described rear ends of the pair of flutes 9 is formed to be larger than a chisel edge length of the second chisel edge 23.

In this manner, with respect to the chisel edge length of the second chisel edge 23, a sufficiently thick web thickness of the cutting portion 15 is secured. Thus, even in such a case when a feed per revolution of the drill 1 becomes large, the drill 1 is capable of performing the cutting in a stable manner.

Next, a drill 1 according to a second embodiment of the present invention will be described with reference to FIGS. 16 to 18. Note that different configurations of the drill of the present embodiment from the drill according to the first embodiment will be described in detail below. Thus, when portions of the drill of the present embodiment are the same as those of the drill of the first embodiment, the same reference numerals will be used and detailed descriptions will be omitted for those portions.

The drill 1 of the present embodiment is provided with the drill body 3, the pair of main cutting edges 5, the minor cutting edge 7, the pair of flutes 9, and the pair of fluted land faces 11 in the same manner as the drill 1 of the first embodiment, as illustrated in FIG. 16. Further, the minor cutting edge 7 in the drill 1 of the present embodiment has the pair of first chisel edges 21 and the second chisel edge 23 in the same manner as in the drill 1 of the first embodiment.

The pair of first chisel edges 21 in the first embodiment has the linear section 21a as viewed from the front end. Meanwhile, as illustrated in FIGS. 17 and 18, each of the first chisel edges 21 in the present embodiment has a concavely curved section 21b that is recessed toward the rear side of the rotational direction of the rotation axis X as viewed from the front end. Specifically, each of the first chisel edges 21 has the concavely curved section 21b that is recessed further to the rear side in the rotational direction of the rotation axis X, as viewed from the front end, than an imaginary straight line connecting an intersection point between the first chisel edge 21 and the second chisel edge 23 and an intersection point between the first chisel edge 21 and the main cutting edge 5.

As already described above, when each of the first chisel edges 21 has the linear section 21a, even when the web thickness of the cutting portion 15 is made thicker, the minor cutting edge 7 is capable of having high durability. On the other hand, when each of first chisel edges 21 has the concavely curved section 21b that is recessed toward the rear side of the rotational direction of the rotation axis X as viewed from the front end, as described above, this configuration is capable of enhancing the chip-evacuation performance.

Upon performing the cutting, when the first chisel edge 21 has the above-described shape, the chips cut by the first chisel edge 21 are curved according to the shape of the concavely curved section 21b. Thus, the chips generated at ends of the first chisel edge 21 are pulled by the chips generated at a central section of the first chisel edge 21. Thus, the chips generated at the second chisel edge 23 adjacent to the first chisel edge 21 are pulled by the chips generated at the first chisel edge 21.

As a result of the chips generated at the second chisel edge 23 being pulled, cracks come more likely to occur in the chips generated by the second chisel edge 23 in the vicinity of the rotation axis X. Those cracks are spread from the chips generated by the second chisel edge 23 to the chips generated by the first chisel edges 21 and the chips generated by the main cutting edges 5. Thus, the chips are fragmented, thereby enhancing the chip-evacuation performance.

When the pair of the main cutting edges 5 has a concavely curved section, as viewed from the front end, as in the drill 1 of the present embodiment, a curvature of the concavely curved section 21b in the first chisel edge 21 is preferably smaller than a curvature of the concavely curved section in the main cutting edge 5 as viewed from the front end. In this type of case, it is more likely that the pulling force of the chips generated by the first chisel edges 21 that pulls the chips generated by the main cutting edges 5, becomes larger than the pulling force of the chips generated by the main cutting edges 5 that pulls the chips generated by the first chisel edges 21. Therefore, the chips generated by the first chisel edges 21 can more easily flow into the pair of flutes 9 connected to the pair of main cutting edges 5.

[Method for Manufacturing Cut Product]

Next, a method for manufacturing a cut product according to an embodiment of the present invention will be described while referring, as an example, to a case in which the drill according to the above-described embodiments is used. The following describes the method with reference to FIGS. 19 to 21.

The method for manufacturing the cut product according to the present embodiment is provided with steps from (1) to (4) described below.

(1) A step of arranging the drill 1 above a prepared work material 101 (see FIG. 19).

(2) A step of causing the drill 1 to rotate around the rotation axis X in the direction of the arrow Y1 and of causing the drill 1 to come closer to the work material 101 in a direction Y2 (see FIGS. 19 and 20).

This step can be performed by fixing the work material 101 on a table of a machining tool to which the drill 1 is attached and causing the drill 1 to come closer to the work material 101 in a rotating state, for example. Note that, at this step, it is sufficient if the work material 101 and the drill 1 only move relatively closer to each other, so the work material 101 may be caused to come closer to the drill 1.

(3) A step of causing the pair of main cutting edges and the minor cutting edge of the rotating drill 1 to come into contact with a desired position on a surface of the work material 101 by causing the drill 1 to further get closer to the work material 101, and of forming a drilled hole (a through hole) 103 in the work material 101 (see FIG. 20).

At this step, from a viewpoint of obtaining a good finished surface, a setting is preferably made so that, of the cutting portion of the drill 1, a part of the region on the rear end side of the drill 1 does not penetrate through the work material 101. Specifically, as a result of causing the part of the region to function as a margin region for chip evacuation, excellent chip-evacuation performance via the region can be achieved.

(4) A step of separating the drill 1 from the work material 101 in a direction Y3 (see FIG. 21).

Also at this step, in the same manner as at the above-described step (2), it is sufficient if the work material 101 and the drill 1 are relatively separated from each other, so the work material may be caused to be separated from the drill 1, for example.

By going through the above-described steps, excellent workability can be achieved.

Note that, in a case in which the above-described cutting of the work material 101 is performed a plurality of times, and when a plurality of the drilled holes 103 are formed with respect to the one work material 101, for example, it is sufficient to repeat the step of causing the pair of main cutting edges and the minor cutting edge of the drill 1 to come into contact with different positions of the work material 101, while maintaining the rotating state of the drill 1.

Although some embodiments according to the present invention are illustrated above, the present invention is not limited to those embodiments. Needless to say, the present invention may be modified in a desired manner without departing from the scope of the invention.

For example, the shape of the cutting portion 15 is not limited to the configuration of the above-described embodiments, but other generally-used shapes can also be adopted. For example, the cutting portion 15 may have a tapered shape in which the web thickness of the inscribed circle becomes thicker from the front end section toward the rear end section. Further, the cutting portion 15 may have a drill diameter (an outer diameter) that is inclined so as to become larger or smaller from the front end section toward the rear end section. Furthermore, the cutting portion 15 may be provided with a so-called undercut portion or a clearance portion.

Further, although in the above-described embodiments, the flute width of the pair of flutes 9 is constant from the front end side to the rear end side, alternatively, the flute width of the flutes 9 may become larger or smaller from the front end section toward the rear end section. Further, the flute widths of the pair of flutes 9 may be different from each other. Furthermore, the pair of flutes 9 may be formed to be joined to each other by changing the helix angle of one of the pair of flutes 9 or the helix angles of both of the pair of flutes 9.

Further, in the above-described embodiments, the drill 1 is described that is provided with the cutting portion 15 having a configuration in which a part including the front end can be attached to and removed from a part positioned on the rear end side. However, alternatively, the drill 1 may have the cutting portion 15 formed by one member. Even in this case, the same effects can be achieved as in the drill 1 according to the above-described embodiments.

REFERENCE NUMBER

1 Drill
3 Drill body
3a Front end portion
5, 5a, 5b Main cutting edge
7 Minor cutting edge
9, 9a, 9b Chip evacuation flute (flute)
9c First region
9d Second region
9e Third region
11 Fluted land face
11a Margin
11b Body clearance
13 Gripped portion
15 Cutting portion
17 First connection region
19 Second connection region
21 First chisel edge
21a Linear section
21b Curved section
23 Second chisel edge
23a Linear section
23b Both end sections
23c Central section
25a, 25b, 25c Cutting face
101 Work material
103 Drilled hole

What is claimed is:

1. A drill, comprising:
   a rod-shaped drill body rotatable around a rotation axis;
   a pair of main cutting edges positioned on a front end portion of the drill body;
   a minor cutting edge that is positioned on the front end portion and connects the pair of main cutting edges; and
   a pair of flutes that are disposed on an outer periphery of the drill body and extend in a spiral manner around the rotation axis from the pair of main cutting edges toward a rear end portion of the drill body,
   the minor cutting edge comprising:
      a pair of first chisel edges, each extending from the pair of main cutting edges toward the rotation axis, and each comprising a first straight line; and
      a second chisel edge that;
         is positioned between the pair of first chisel edges;
         intersects with the rotation axis;
         comprises a second straight line; and
         is shorter than the pair of first chisel edges, and
   in cross-section view, a first locus of rotation of the pair of first chisel edges each comprises a single straight line and imaginary straight lines obtained by extending the first locus toward the rotation axis are positioned further to a rear end side of the drill body than a second locus of rotation of the second chisel edge,
   wherein, in the front end view, the second chisel edge is inclined with respect to the pair of the first chisel edges and the first straight line and the second straight line form an obtuse angle in the front end view.

2. The drill according to claim 1, wherein the pair of first chisel edges each comprise a linear section in a front end view.

3. The drill according to claim 2, wherein the second chisel edge comprises a linear section in the front end view.

4. The drill according to claim 3, wherein, in the front end view, imaginary straight lines obtained by extending both ends of the linear section of the second chisel edge respectively intersect with imaginary straight lines obtained by extending the linear sections of the pair of first chisel edges.

5. The drill according to claim 3, wherein both end sections of the second chisel edge, which are connected to the pair of first chisel edges, are positioned further to the rear end side of the drill body than a central section of the second chisel edge, the central section intersecting with the rotation axis.

6. The drill according to claim 5, wherein the second chisel edge is shaped as a convexly curved surface in a side view from a direction perpendicular to the rotation axis with respect to a section of the second chisel edge intersecting with the rotation axis.

7. The drill according to claim 3, wherein, in the front end view, the pair of main cutting edges each comprise a concavely curved section, and a tangent of an end of the concavely curved section on a side connected to the first chisel edge intersects at an acute angle with an imaginary straight line obtained by extending the linear section of the second chisel edge.

8. The drill according to claim 1, wherein the flute comprises a first region that is positioned on a front end side of the drill body and comprises a helix angle $\alpha 1$, a second region that is positioned further to a rear end side of the drill body than the first region and comprises a helix angle $\alpha 2$ that is smaller than the helix angle $\alpha 1$, and a third region that is positioned further to the rear end side of the drill body than the second region and comprises a helix angle $\alpha 3$ that is larger than the helix angle $\alpha 2$.

9. The drill according to claim 8, wherein the helix angle $\alpha 1$ is larger than the helix angle $\alpha 3$.

10. The drill according to claim 8, wherein the second region is connected to the first region via a first connection region in which a helix angle smoothly changes from the helix angle $\alpha 1$ to the helix angle $\alpha 2$ from the front end side of the drill body toward the rear end side of the drill body, and
   the third region is connected to the second region via a second connection region in which a helix angle smoothly changes from the helix angle $\alpha 2$ to the helix angle $\alpha 3$ from the front end side of the drill body toward the rear end side of the drill body.

11. The drill according to claim 8, wherein a length of the second region in a direction parallel to the rotation axis is longer than each of lengths of the first region and the third region in the direction parallel to the rotation axis.

12. A method for manufacturing a cut product, comprising:
   causing a drill described in claim 1 to rotate around the rotation axis;
   causing the pair of main cutting edges and the minor cutting edge of the drill to come into contact with a work material; and
   separating the drill from the work material.

* * * * *